(12) United States Patent
Bard

(10) Patent No.: US 7,028,097 B2
(45) Date of Patent: Apr. 11, 2006

(54) WIRELESS LAN WITH DYNAMIC CHANNEL ACCESS MANAGEMENT

(75) Inventor: Steven R. Bard, Vancouver, WA (US)

(73) Assignee: Intel Corporation, Santa Clara, CA (US)

( * ) Notice: Subject to any disclaimer, the term of this patent is extended or adjusted under 35 U.S.C. 154(b) by 674 days.

(21) Appl. No.: 10/109,715

(22) Filed: Mar. 28, 2002

(65) Prior Publication Data

US 2003/0188006 A1    Oct. 2, 2003

(51) Int. Cl.
*G06F 15/16* (2006.01)
*G06F 15/173* (2006.01)

(52) U.S. Cl. .................... 709/232; 370/465
(58) Field of Classification Search ............. 709/223, 709/245, 232; 370/465
See application file for complete search history.

(56) References Cited

U.S. PATENT DOCUMENTS 6,327,254 B1 * 12/2001 Chuah ................ 370/328

FOREIGN PATENT DOCUMENTS

| EP | 1 176 762 A1 | 1/2002 |
|---|---|---|
| WO | WO 99/11081 | 3/1999 |
| WO | PCT/US 03/ 08763 | 3/2003 |

* cited by examiner

*Primary Examiner*—Kamini Shah
(74) *Attorney, Agent, or Firm*—Blakely, Sokoloff, Taylor & Zafman LLP

(57) ABSTRACT

A system and method for implementing a peer-to-peer wireless local area network (WLAN) that does not require a conventional wireless access point, yet facilitates many of the features provided by an access point, such as channel access management and Quality of Service functions. A method for dynamically selecting a Channel Access Manager (CAM) that (preferably) has the ability to communicate with the greatest number of wireless stations in a given WLAN is provided. The CAM is then used to manage channel access for the WLAN. A method for selecting one or more proxy CAMs that establish communication paths between the CAM and wireless stations with which the CAM traditionally would not be able to communicate is also provided. The invention also provides a method for resolving the issues that occur when a new station is added to the WLAN, and provides optimize routing of messages to maximize transmission bandwidths.

27 Claims, 14 Drawing Sheets

WIRELESS LAN WITH DYNAMIC CHANNEL ACCESS MANAGEMENT

BACKGROUND OF THE INVENTION

1. Field of the Invention

The present invention concerns networking in general, and wireless computer networks in particular.

2. Background Information

Recently, wireless networking components have been introduced that enable users to set up and use wireless local area networks (WLANs) that reduce or eliminate the installation of network cables that are necessary for conventional "land-line" computer networks, such as Ethernet networks. These WLANs are popular for use in buildings that are difficult to wire for conventional networking, such as homes and older office buildings, as well as for use in environments in which mobile computers are used and to extend the range of conventional wired networks.

Presently, there are four primary types of wireless network communication technologies, including Bluetooth, IrDA, HomeRF (SWAP) and WECA (Wi-Fi). Bluetooth provides a lower-cost solution that enables devices in close proximity to communicate using a radio channel. IrDA (Infrared Direct Access) is a standard for devices to communicate using infrared light pulses. This technology, which is used by most remote controls, is generally limited to shorter-range line-of-sight installations. HomeRF corresponds to an alliance of businesses that have developed a standard called Shared Wireless Access Protocol (SWAP). A sort of hybrid standard, SWAP includes six voice channels based on the Digital Enhanced Cordless Telecommunications standard and the IEEE 802.11 wireless-Ethernet specification for data. SWAP uses a technology known as frequency-hopping spread spectrum (FHSS), wherein short bursts of data are sent between frequency shifts (hops). SWAP networks are relatively inexpensive, in part because SWAP does not require an access point, but has limited bandwidth on the order of 1–2 Mbps (megabits per second).

The Wireless Ethernet Compatibility Alliance (WECA) has developed a wireless networking standard called Wi-Fi (wireless fidelity) based on the IEEE 802.11b specification. As with SWAP, Wi-Fi uses spread-spectrum radio waves in the 2.4-gigahertz (GHz) frequency range. However, Wi-Fi uses direct-sequence spread spectrum (DSSS) rather than FHSS to communicate by splitting each byte of data into several parts and sending them concurrently on different frequencies. This results in a bandwidth of up to 11 Mbps whenever an appropriate signal strength is available. If signal strength or interference results in disrupted data, Wi-Fi devices reduce their operating bandwidth to 5.5 Mbps, then 2 Mbps, and finally down to 1 Mbps to maintain network stability.

A Wi-Fi WLAN 10 is shown in FIG. 1. WLAN 10 includes a desktop personal computer (PC) station 12, an APPLE MACINTOSH G-3™ computer station 14, a UNIX workstation station 16, a tower PC station 18, a laptop station 20, and a laptop station 22, each of which is enabled to communicate with the other stations in the WLAN via a wireless access point (AP) 24. In many installations, a wireless AP will also provide a higher-speed network interface for connection to a conventional wired network, such as an Ethernet interface, to enable computers on a WLAN to also access a conventional wired LAN or WAN (wide area network). Accordingly, wireless AP 24 is shown in FIG. 1 as being connected to a network server 26 via an Ethernet link 28; however, it will be understood that a wireless AP may be implemented in configurations in which it is not connected to a LAN or WAN.

In order for a computer to communicate with a wireless AP, a computer may include a wireless network adapter that includes a transceiver designed to send and receive signals in a frequency range corresponding to the WLAN's operation type (e.g., 2.4 GHz frequency range for IEEE 802.11b WLANs). Typically, these wireless network adapters comprise a wireless network adapter card 30 for use in PCs and a PCMCIA wireless network adapter card 32 for use in laptops. Generally, modern APPLE™ computers may include a built-in "Airport" communication port to enable wireless network access, or implement a peripheral card in a manner similar to wireless network adapter card 30. Similar solutions are available for workstations.

An AP provides a basic and extended service set to one or more stations (i.e. computers) that communicate with the AP. The AP facilitates and coordinates communication and channel access between stations. Stations authenticated and associated with an AP typically do not operate in a peer-to-peer mode—communication from one station to another must route through the AP, as shown by communication paths 34, 36, 38, 40, 42, and 44. The AP serves as a relay station for data traffic between stations and, therefore, station-to-station communication takes at least twice the amount of time than if a source station could communicate directly with a target station (i.e., the source station must send data to the AP, which in turn resends the data to the target station). This results in the bandwidth of the wireless media being effectively reduced by half.

In addition to bandwidth reduction, there are other drawbacks common to AP-based wireless networks. One is cost—a typical access point may cost between $200–$1000+. In comparison, wireless network adapter cards cost much less ($70–$300). Another drawback is setup. Depending on the vendor, an AP-based WLAN may require assigning IP addresses to each of the computers in the network, which may also entail a manual configuration of each computer as well. In addition, there may be instances in which the range of the network may need to be extended, but this would require the purchase of an additional AP or an extension point (essentially an AP without a wired network interface) when implementing a conventional Wi-Fi-based WLAN.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE ILLUSTRATED EMBODIMENTS

A system and method for implementing a wireless local area network that does not use access points is described in detail herein. In the following description, numerous specific details are disclosed to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present invention provides a system and method for implementing a peer-to-peer WLAN that does not require an access point, yet facilitates many of the features provided by an AP, such as channel management and Quality of Service functions. The invention defines a method for dynamically selecting a Channel Access Manager (CAM) that (preferably) has the ability to communicate with the greatest number of wireless stations in a given WLAN. The invention also defines a method for selecting one or more proxy CAMs that establish communication paths between the CAM and wireless stations with which the CAM traditionally would not be able to communicate. The invention also provides a method for resolving the issues that occur when a new station is added to the WLAN, and provides optimize routing of messages to maximize transmission bandwidths.

Figure 1:
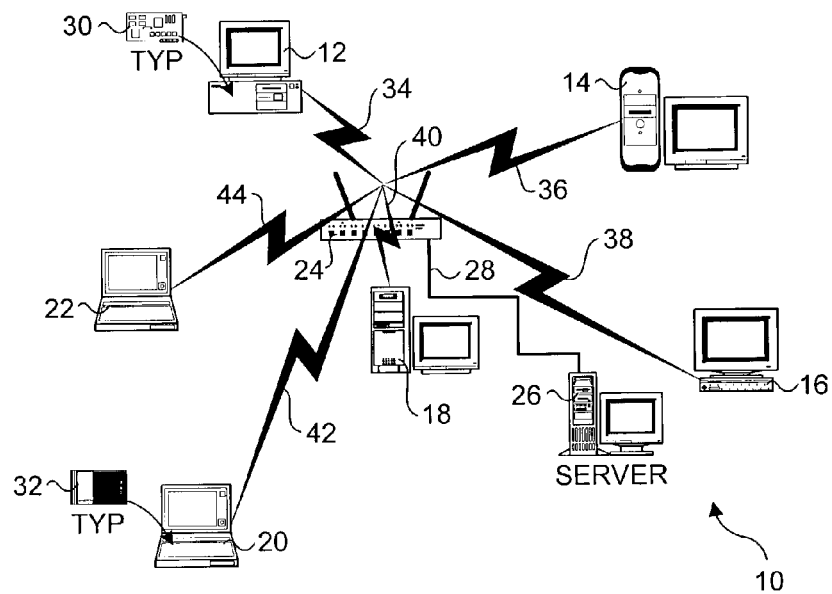
FIG. 1 is a schematic diagram of a conventional wireless LAN (WLAN) that implements a wireless access point.
Figure 2:
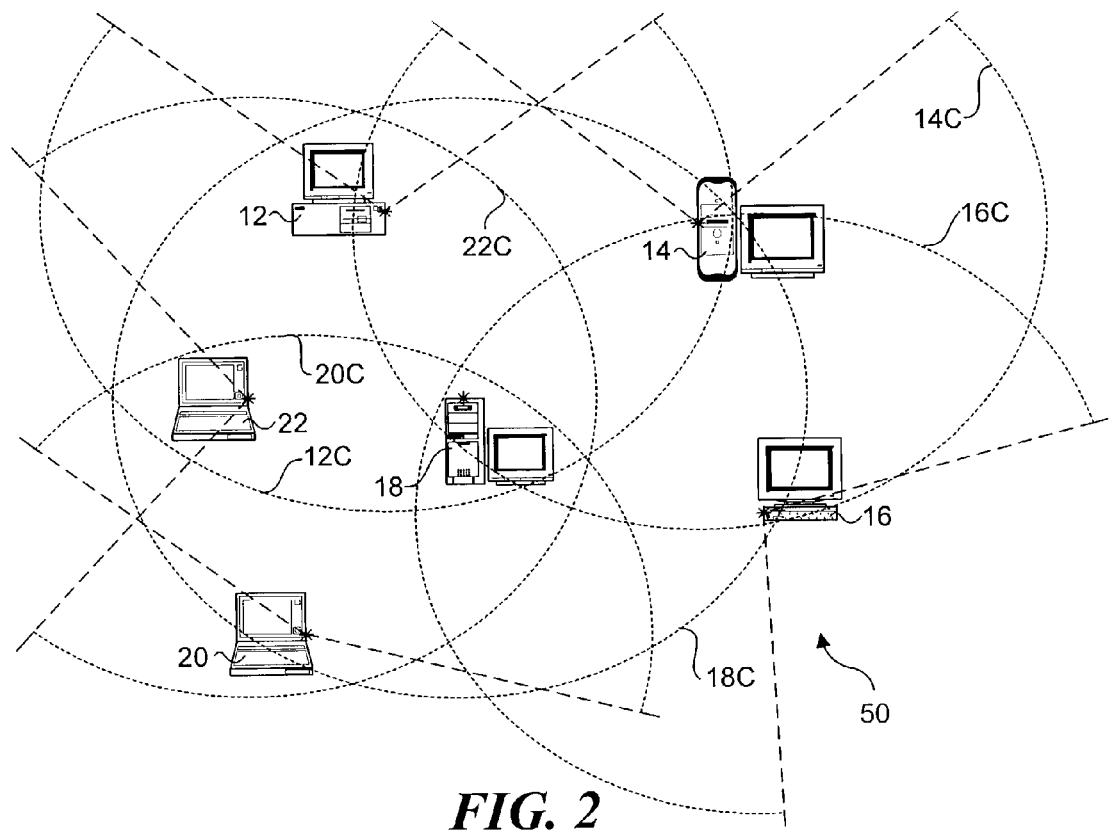
FIG. 2 is a schematic diagram of an exemplary WLAN topology in accordance with one embodiment of the invention.
Figure 3:
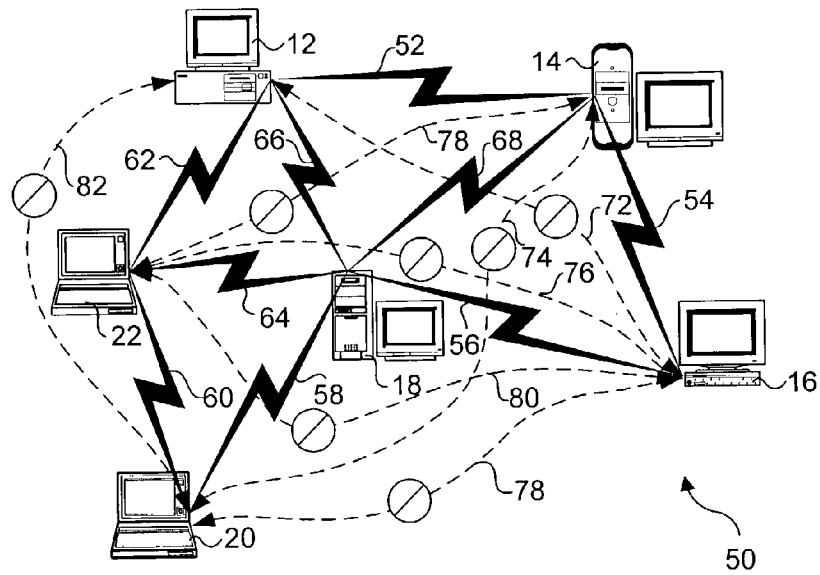
FIG. 3 is a schematic diagram depicting various completed and uncompleted communication paths between the stations of the WLAN topology of FIG. 2.

A typical WLAN configuration 50 in which the invention may be implemented is shown in FIG. 3. WLAN configuration 50 includes the same stations in substantially the same physical locations as in Wi-Fi WLAN 10, but no longer uses access point 24. Also shown in FIG. 2 are arcs and a circle corresponding to respective coverage areas for each station, wherein the arc or circle for a given station has the same reference number as the station to which it is associated plus an appended "C." For example, station 12 has a coverage area represented by an arc 12C. For simplicity, each coverage area is shown to have a constant radius from its transmission point; it will be understood that the actual coverage areas would comprise closed boundaries of various shapes rather than circles in most instances due to interferences discussed below. Furthermore, the arcs used on FIG. 2 are representative of partial coverage areas of their corresponding station, and are used in the figure to reduce its size.

In order for two "peer" stations to communicate, they each need to be in each others' coverage area. Generally, this means they need to be close enough to each other in consideration of potential interference conditions (e.g., walls in buildings, wiring, steel structures, outside radio frequency (RF) interference, etc.). For example, in one embodiment, the invention may be implemented using IEEE 802.11b compatible devices. In general, IEEE 802.11b compatible devices have a transmission range of 1000 feet or less in open areas and 250–400 feet in closed areas (due to interference caused by physical structures such as walls). These transmission ranges can be reduced even further if radio frequency (RF) interference conditions exist, such as RF signals transmitted to or from nearby cellular towers.

Various peer-to-peer communications paths corresponding to WLAN configuration 50 are shown in FIG. 3. Successful communication paths are shown as "lightning bolts," and include communication paths 52, 54, 56, 58, 60, 62, 64, and 66. Each of these communication paths identifies that the pair of stations connected by the communication path are proximate enough to communicate with each other under current operating conditions. Also shown in FIG. 3 are incomplete communication paths, which comprise dashed lines covered with a "NO" symbol (i.e., a circle with a angled bar crossing it). These include incomplete paths 70, 72, 74, 76, 78, and 80. An incomplete communication path indicates that the two stations to which the path connects are not close enough to each other to enable satisfactory communication.

There are two immediate problems illustrated in FIG. 3. The most obvious problem is the incomplete communication paths. One of the primary features of a LAN is that each station may access any other station in the network. As discussed above, this function is normally provided by the access point, which no longer exists. A less obvious problem concerns "hidden" stations. In short, a hidden station is a station that is unknown (i.e. out of range, and thus not "visible") to another station in the network. This creates problems because transmissions between one set of peer stations may inadvertently interfere with transmissions between another set of peer stations.

Figure 4:
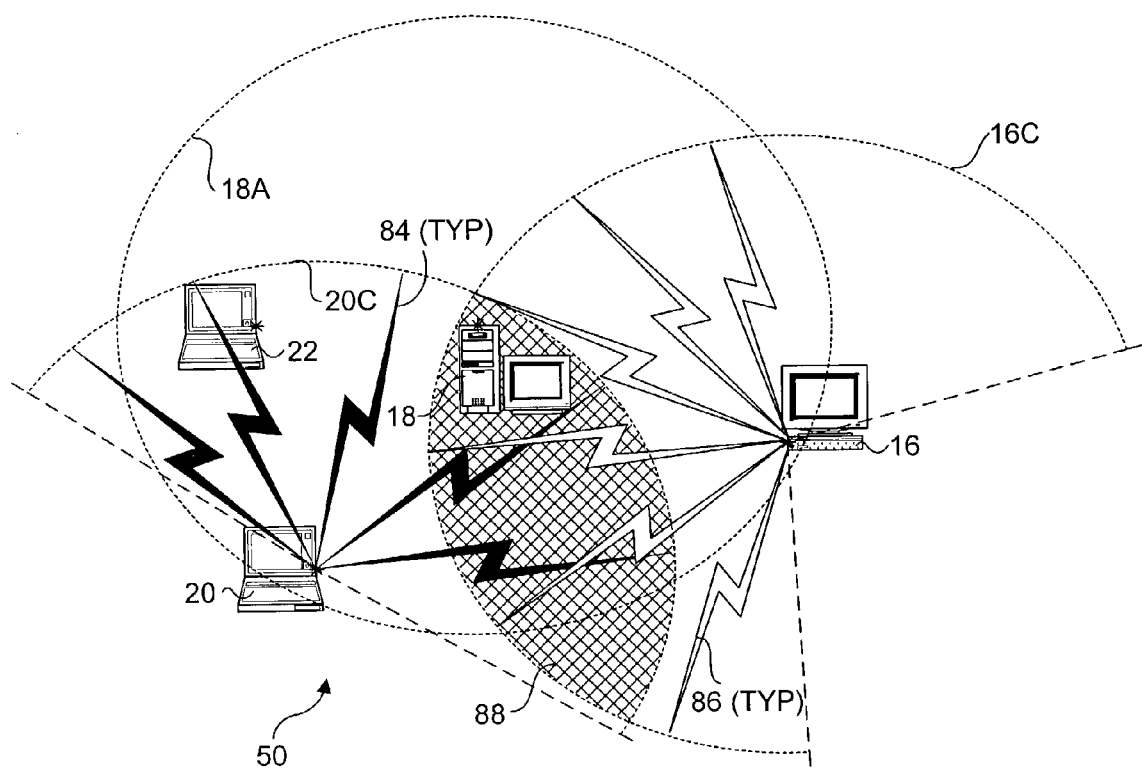
FIG. 4 is a schematic diagram illustrating radio interference that occurs when two stations attempt to transmit data within range of or to a common station.

For example, suppose the wireless media appears "idle" to stations 20 and 22. Consequently, either station may begin a transmission to the other, such as depicted by transmission signals 84 in FIG. 4. Now suppose that at the same time, station 16 was in the process of transmitting data to station 18 via transmission signals 86. Since station 16 is out-of-range from either of stations 20 or 22, neither of these latter stations will know that station 16 is transmitting to station 18. However, station 18 is in range of all of stations 16, 20, and 22. As a result, transmission signals 84 will be received by station 18 as well as the station targeted for reception of the signal (station 22), since transmitted signals are substantially transmitted as omni-directional RF signals from their transmission point, as depicted by signals 84 in FIG. 4, rather than the unidirectional transmission paths shown in FIG. 3. As a result, a signal interference region 88 is created, wherein any reception point (e.g., station 18) within the signal interference region may have reception problems when it receives signals that are transmitted concurrently from two or more different stations that are within range of the reception point. To address the foregoing incomplete signal path and hidden station problems, the invention employs a combination of CAMs, proxy CAMs (PCAMs), and client CAMs (CCs), as described below.

Figure 5A:
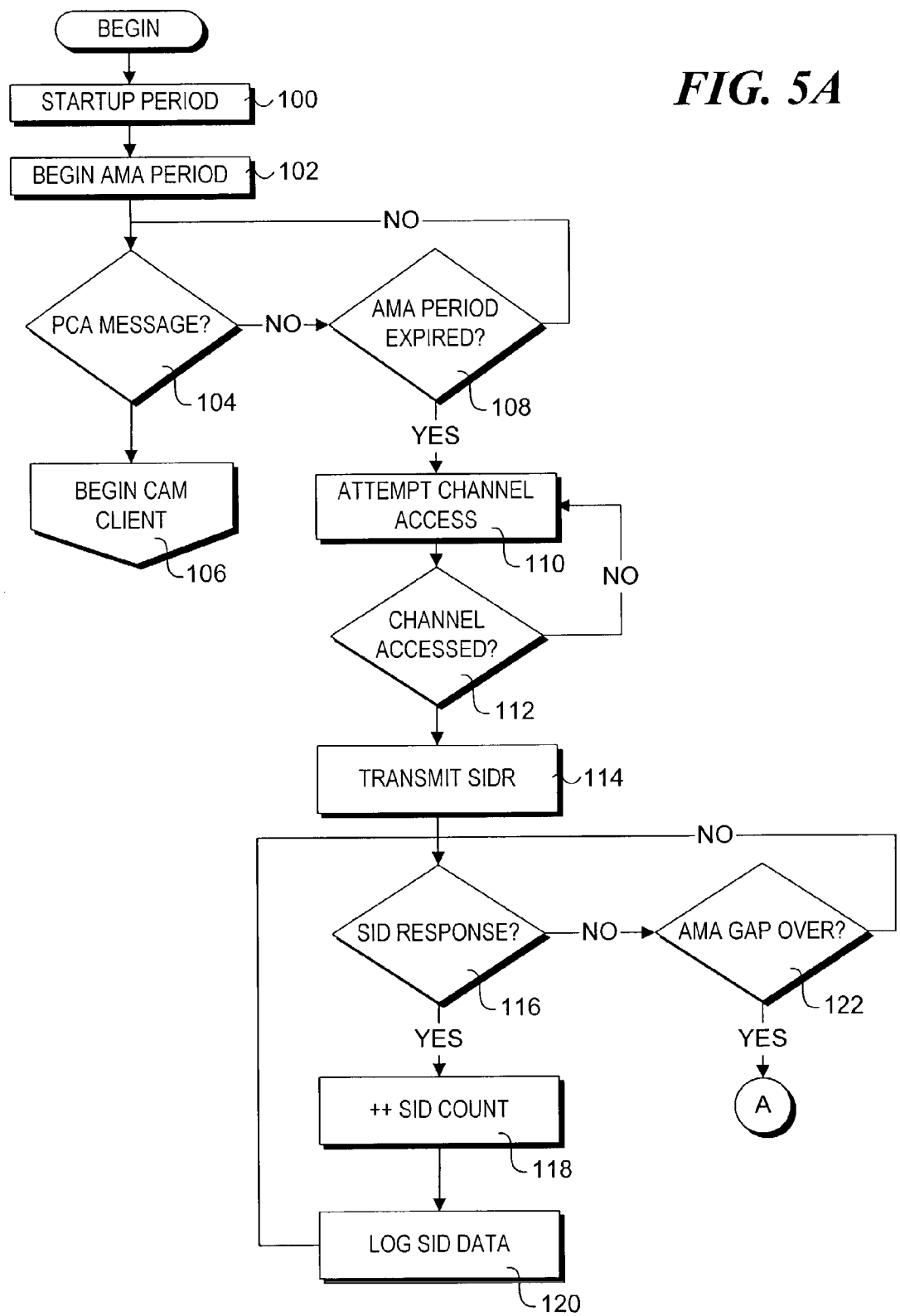
FIGS. 5A and 5B collectively comprise a flowchart illustrating the logic used by one embodiment of the invention to determine the best station to use for a channel access manager (CAM)

The first operation when establishing a new WLAN configuration is to determine which station(s) in the network shall be assigned to operate as (the) CAM(s). With reference to the flowchart of FIGS. 5A and 5B, this process begins in a block 100 in which automatic configuring of the wireless stations is performed during a timeframe known as the "startup" period. During the startup period, each of the wireless stations will obtain a valid Internet Protocol (IP) address. In one embodiment, the IP addresses are obtained using an industry standard auto-configuration process. Immediately following the startup period, an "Access Manager Arbitration" (AMA) period begins in a block 102, during which each station becomes a New CAM candidate (NCC). NCC stations monitor the channel for the presence of a Priority Client Access (PCA) message, as depicted by a decision block 104. The channel is selected as the NCC scans all channels looking for the active channel, i.e. the channel where the PCA message is being transmitted. The length of the PCA message is such that it exceeds the maximum time required for a scan of all channels by a potential receiving station.

As provided by a block 106, upon detection of the PCA message, the NCC is able to determine the station identity of the CAM (or PCAM) and begins to execute an CAM Client protocol as defined below. When an NCC does not detect a PCA message before the expiration of the AMA period (as indicated by a YES result for a decision block 108), the station becomes a CAM candidate (CAMC) and executes a channel Access Manager arbitration protocol. As depicted by a block 110 and decision block 112, each CAMC attempts channel access in accordance with channel access methods defined by the IEEE 802.11 specification (1999) on a repeated basis until a channel is successfully accessed.

Once gaining channel access, a CAMC transmits a Station Identification Request message (SIDR) to all other stations in a block 114. Each wireless station that is in communication range of the CAMC will respond to the SDIR with a Station Identification (SID) message packet. The SID response contains respondent station identification information (e.g., IP address, MAC address, and other pertinent station identification information). As provided by a decision block 116 and blocks 118 and 120, in response to each message SID message packet, the CAMC increments it SID count and logs the response.

Figure 5B:
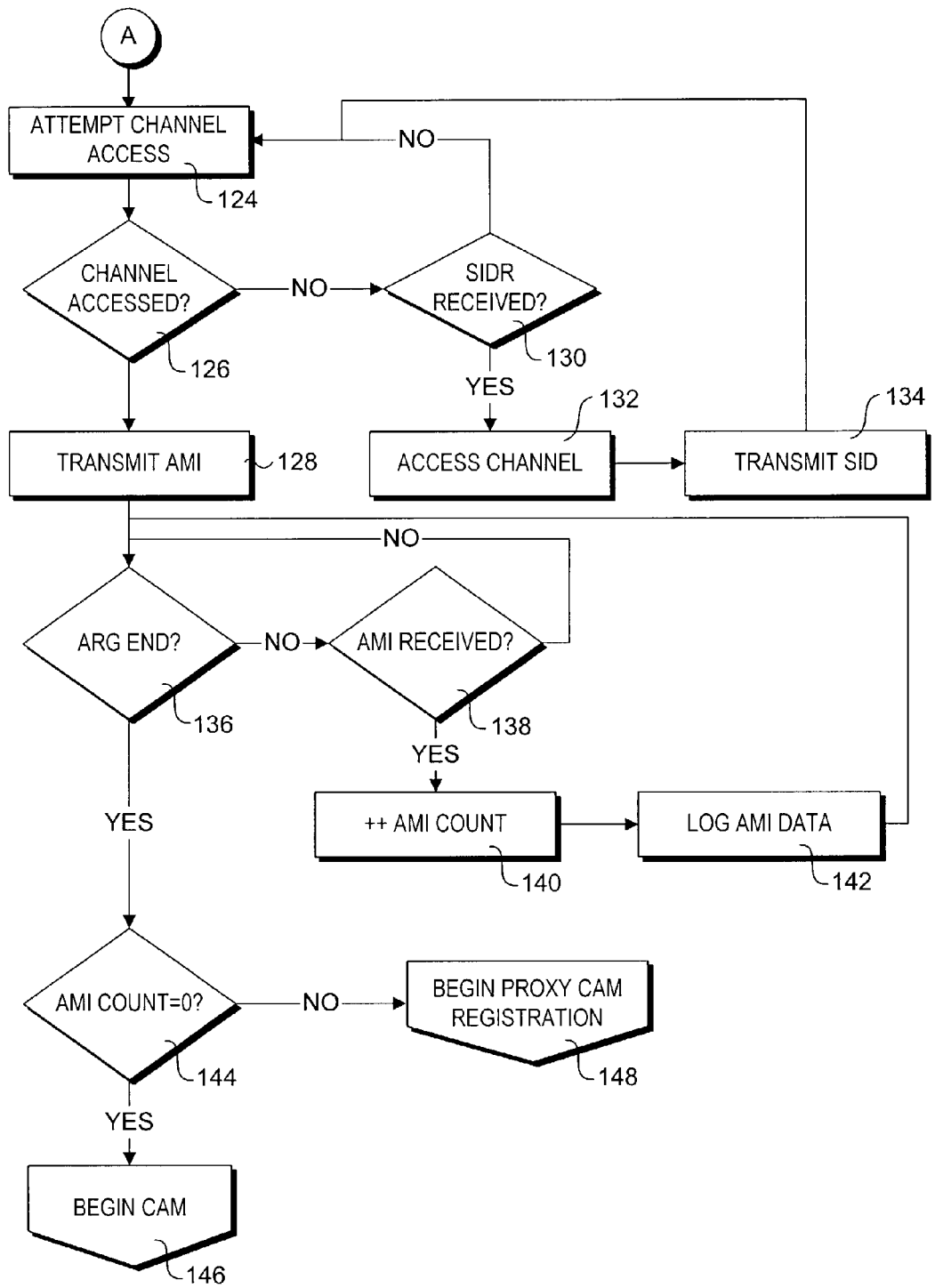

When all CAMC stations have transmitted SIDR messages and all stations have responded, the channel becomes idle for a period defined as the "Access Manager Arbitration Gap" (AMAG), which is checked for completion in a decision block 122. With reference to FIG. 5B, upon expiration of the AMAG, a CAMC attempts to access the channel until successful in accordance with blocks 124 and 126, and then transmits an Access Manager Information (AMI) message in a block 128. The AMI message contains the CAMC station identification information, the number of responses the CAMC received to its SIDR message, and station identifiers for each of the responses. As depicted by a decision block 130, if an SIDR message is received during this time frame, the channel is accessed in a block 132, and a SID message is transmitted in a block 134.

In response to receiving an AMI message, each receiving CAMC will compare the SIDR response count sent with the message with its own SIDR response count. If a receiving CAMC determines that its response count is larger, it will transmit its own AMI message over the channel; otherwise, it will not respond. CAMC stations with a higher response count must begin transmission of their AMI message within a period defined as the AMI Response GAP (ARG), which begins when the previous CAMC has completed transmission of its AMI message. Accordingly, a determination is made in a decision block 136 to whether the ARG has ended. If it has not, a determination is made in a decision block 138 to whether an AMI message is received. If it has not the logic loops back to decision block 136. If an AMI message is received, the AMI count for the CAMC is incremented in a block 140 and AMI message data is logged in a block 142, returning the logic to decision block 136.

Once the ARG has ended, as indicated by a YES to decision block 136, the logic proceeds to a decision block 144 in which a determination is made to whether the AMI count=0 for each of the CAMC's. The last CAMC to transmit an AMI message will have an AMI count=0. This CAMC becomes the CAM and the logic proceeds to begin CAM operations in a block 146. If the AMI count>0, which will be the case for all of the other CAMC's in the WLAN, a proxy CAM registration process is began in a block 148 to determine whether any of these CAMC's qualify as proxy CAMs.

In accordance with the foregoing logic, the last CAMC to transmit an AMI message before the ARG expires becomes the CAM. This method ensures that the greatest number of stations in the WLAN have the station identifier of the CAM. The station that becomes the CAM is then used to manage channel access for all wireless station communication in the network, as described below with reference to FIGS. 9A and 9B.

Suppose that the foregoing CAM selection algorithm was applied to WLAN configuration 50. In this instance, all of stations 12, 14, 16, 18, 20, and 22 would initially qualify as CAMCs. Recall, the SIDR response count corresponds to the count of all stations that response to a given CAMC's SIDR message. In accordance with WLAN configuration 50, the number of responses for each station will correspond to the number of transmission areas in which each station resides (outside of its own transmission area). For instances, station 12 falls within transmission areas 14C, 18C, and 22C, so its count is 3. The respective results for the other stations are station 14=3, station 16=2, station 18=5, station 20=2, and station 22=3. As a result, station 18 would become the CAM for WLAN configuration 50.

Establishing Proxy CAMs and CAM Clients

Figure 6:
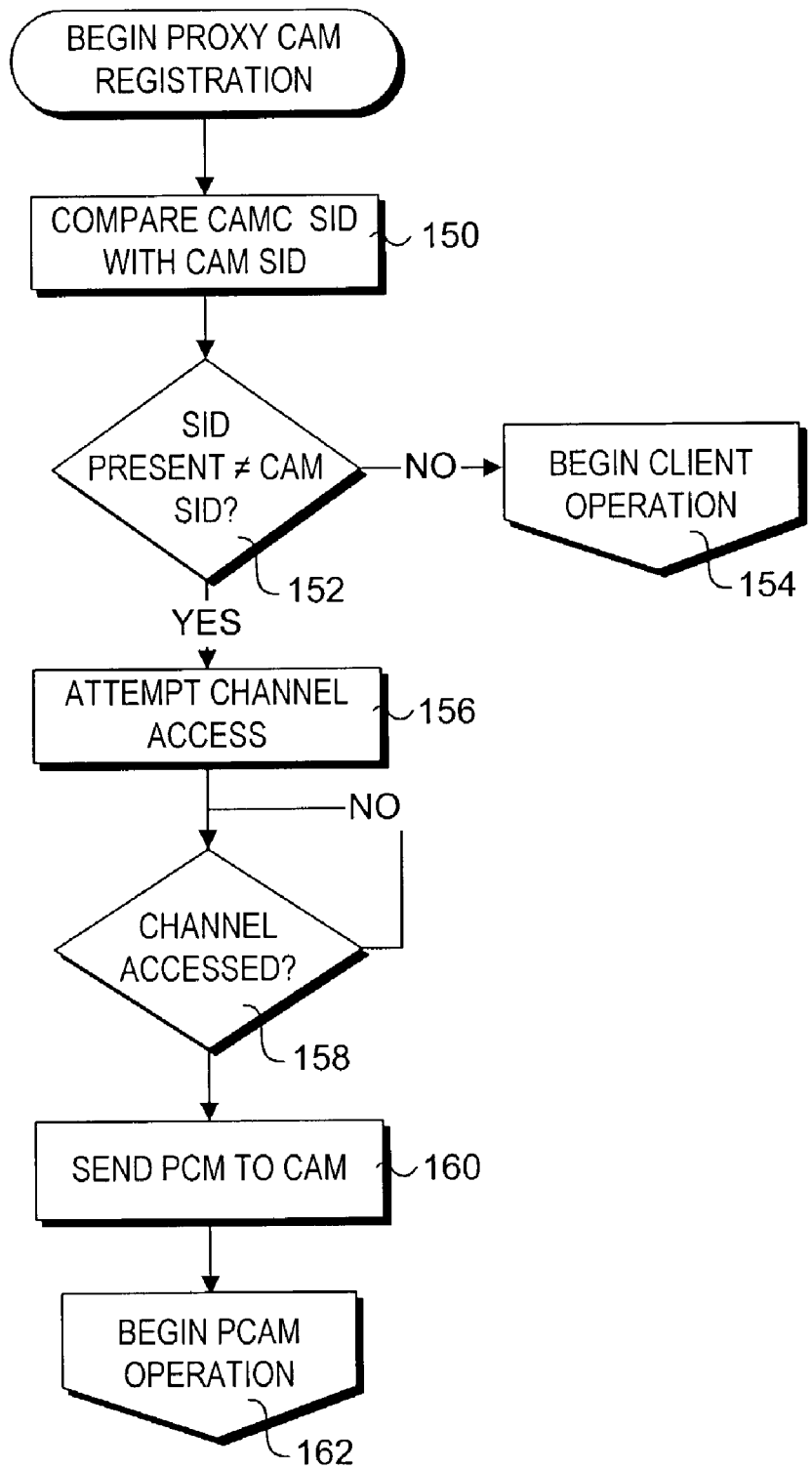
FIG. 6 is a flowchart illustrating the logic used by one embodiment of the invention when registering a proxy channel access manager (PCAM)

Stations that are not the CAM become either a proxy CAM or a CAM client. With reference to the flowchart of FIG. 6, proxy CAM initialization is performed as follows. Proxy CAMs begin their existence as a CAM Candidate with an AMI message count greater than 0. CAMC stations with an AMI count greater than zero have a record of the CAM station identifier as well as the identifiers of the stations with whom the CAM is able to communicate. The following operations are applied to each CAMC, with the objective of identifying any CAMC's that are able to communicate with both the CAM and another CAMC that is not within communication range with the CAM.

In a block 150, the CAMC performs a comparison of the CAM station identifiers with the station identifiers the CAMC received in its SIDR response messages. From this information, a determination can be made in a decision block 152 to whether there are any stations the CAMC can see that can't be seen by the CAM. A CAMC becomes a CC when all of the stations identifiers from its own SIDR responses compare with the station identifiers in the AMI message from the CAM. This corresponds to a NO result from decision block 152, whereupon the CAMC becomes a CAM client (CC), and client operations are began in a block 154 as described below with reference to FIGS. 11A and 11B.

If a CAMC SID list includes a SID that is not included in the CAM SID list, the answer to decision block 152 is YES, and the logic proceeds to blocks 156 and 158, wherein an attempt to access the channel is made until successful. The CAMC then sends a PCM (proxy CAM Message) in a block 160, and begins PCAM operation in a block 162.

Figure 7:
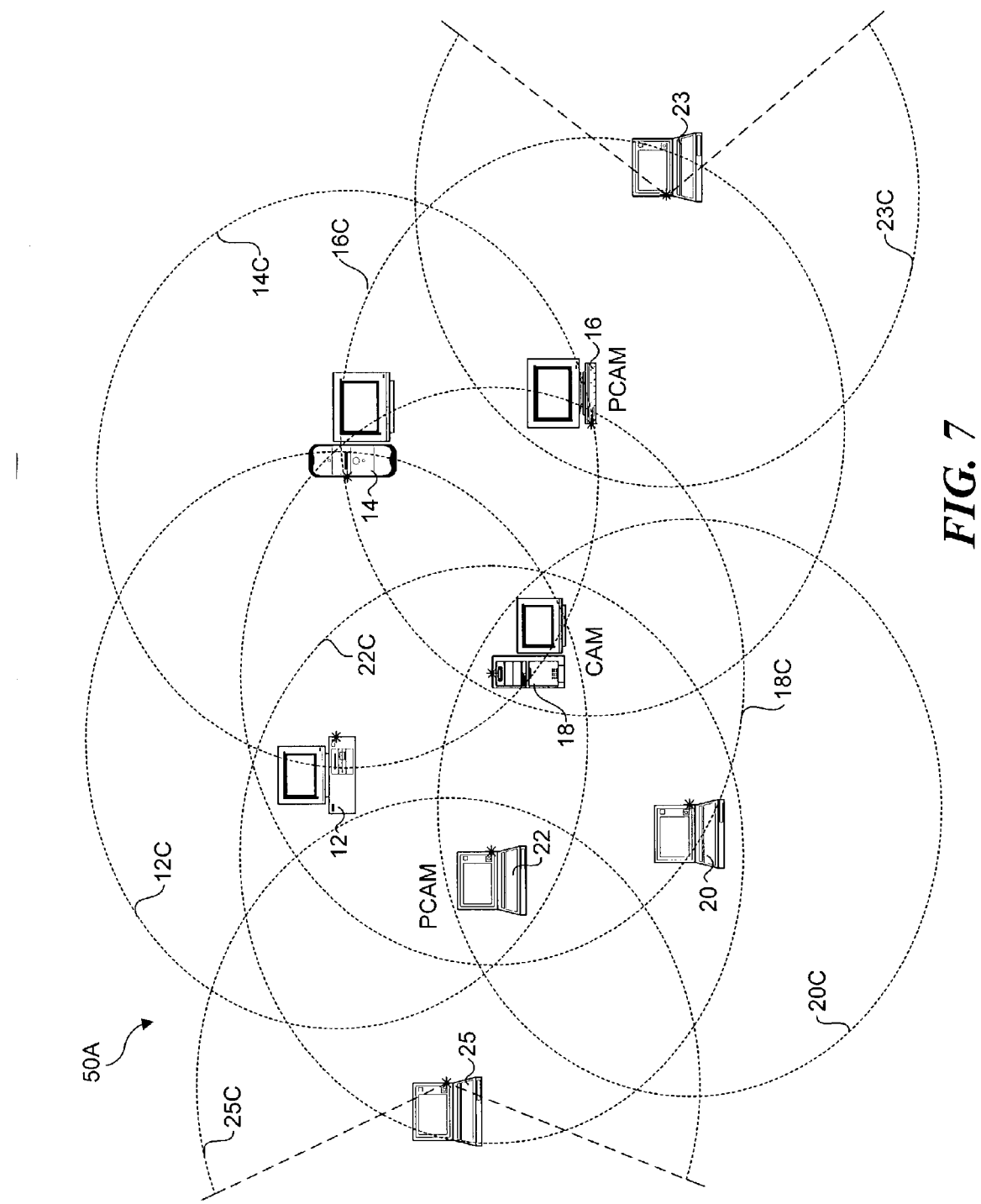
FIG. 7 is a schematic diagram depicting the WLAN of FIG. 2 with the addition of two laptop stations and the implementation of two PCAM stations to access the new laptop stations.

An exemplary result of the foregoing proxy CAM registration algorithm corresponding to a WLAN configuration 50A is shown in FIG. 7. WLAN configuration 50A is identical to WLAN configuration 50, except for the addition of a wireless stations 23 and 25 which respectively have corresponding coverage area 23C and 25C. As depicted in FIG. 7, the only other station within coverage area 23C is station 16, which is not the CAM (i.e. station 18). Accordingly, station 16 becomes a proxy CAM. Similarly, the only other station within coverage area 25C is station 22, which also becomes a PCAM. As a result, stations 23 and 25 are now enabled to join the WLAN, wherein CAM station 18 is enabled to communicate with station 23 via PCAM station 16 and with station 25 via PCAM station 22. It is further noted that if station 18 was an access point with the same coverage that the additions of stations 23 and 25 to the WLAN would not be possible, since these stations would be outside of the range of the access point.

PCAM and CC station monitor the channel for PCM messages. When a CC or a PCAM captures a PCM message, it parses the PCM message for it own station ID. When found, the CC or PCAM records the station ID of its CAM and/or PCAM. From a practical standpoint, it may be necessary to limit the number of PCAM's in a WLAN to avoid excessively long PCA prefix periods.

Figure 8:
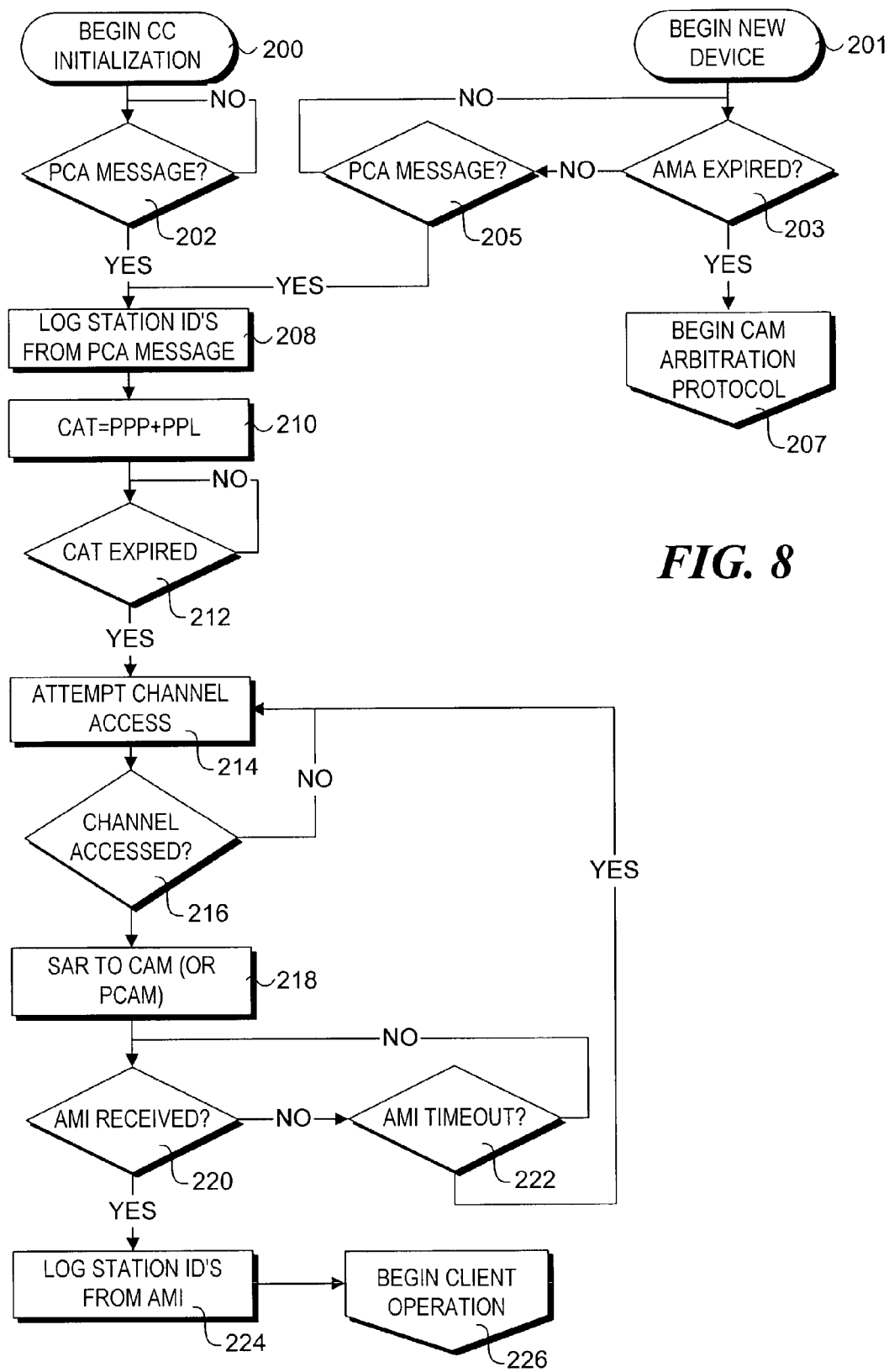
FIG. 8 is a flowchart illustrating the logic used by one embodiment of the invention when initializing a CAM client.

With reference to the flowchart of FIG. 8, initialization of a CAM client (CC) begins in a block 200 and a decision block 202, with the CC waiting to detect a Priority Client Access (PCA) message. Upon detecting a PCA message, the CC captures the station ID of the CAM (or PCAM, if applicable) that sent the PCA message in a block 208, and sets the value of its Channel Access Timer (CAT) to a value equal to the sum of a PCA prefix period (PPP) and the PCA period length (PPL) in a block 210. The PPP is a period that precedes the actual PCA period and is the amount of time during which each PCAM must relay the PCA start signal to its CAM clients. The PPL is the time allocated for registered priority clients to transmit their data. A PPL length of zero indicates that the CAM (or PCAM) has not registered as a station with a requirement for priority data delivery.

In accordance with a decision block 212, the CC attempts to access the channel in the manner discussed above, as provided by blocks 214 and 216, after waiting for the CAT to expire. Once successful channel access is obtained, the CC transmits a Station Associate Request (SAR) message to the CAM (or PCAM) in a block 218 and enters an idle state waiting for an AMI message from the CAM (or PCAM), as depicted by decision blocks 220 and 222.

When the CAM or a PCAM receives an SAR message, it adds the station identifier of the source of the SAR message and then transmits its AMI message to all client stations in its coverage area. Upon receiving an AMI message, the CC logs the station identifiers for the CAM (or PCAM) and the identifiers of the stations managed by the CAM (or PCAM) in a block 224, and proceeds to a block 226 to begin normal CC operations as described below.

Association of New Devices Appearing in the WLAN

When a new device appears in the WLAN, it becomes a New CAM Candidate (NCC). Processing of NCC begins in a block 201 in the flowchart of FIG. 8. Before attempting channel access, the NCC monitors the channel waiting to detect a Priority Client Access (PCA) message for a period defined as "Access Manager Arbitration" (AMA), as shown by decision blocks 203 and 205. If an NCC does not detect a PCA message before the AMA period expires, as identified by a YES result for decision block 202, the logic flows to a block 207 in which the NCC becomes a CAMC and executes the Channel Access Manager arbitration protocol in the manner discussed above. If a PCA message is detected, the NCC becomes a CC, and is initialized in a similar manner discussed above for initializing a CC.

Quality of Service

The present invention provides Quality of Service (QOS) features that are not available with conventional WLANs. These QOS features include handling of asynchronous data delivery, and time-critical data delivery.

For asynchronous data, that is data that does not have to be delivered in a time-critical manner, each CC that has asynchronous data to deliver to another station uses a Request to Send (RTS) and Clear to Send (CTS) access protocol with the CAM or PCAM. A CC desiring channel access monitors the channel until it detects an idle period. Upon detecting idle, the CC transmits an RTS to the CAM or the PCAM. If there are no outstanding authorized transmissions, the CAM (or PCAM) responds with a CTS message. Upon receipt of a CTS message, the CC transmits its data to the target wireless station. A PCAM does not respond with a CTS message until it receives a CTS message from the CAM. In instances where a PCAM is performing proxy services, an RTS sent to a PCAM is forwarded to the CAM. A PCAM also forwards CTS messages it receives from the CAM to the CC.

Any CC that has time domain critical delivery data (e.g., steaming media) registers as a priority CAM client (PCC) with the CAM or its PCAM. A PCAM registers as a priority proxy CAM (PPC) with the CAM. When a PPC registers with the CAM, the registration includes the count of PCC stations for which it performs a proxy service. During registration, the PCC specifies the amount of channel access time required to transmit its data. The CAM (or PCAM) acknowledges a PCC registration request with a Registration Acknowledge (RACK) message. The RACK message contains the amount of time allocated to the PCC for transmission of its priority data. The amount of time will never be greater then that requested but may be lower—as low as zero (indicating registration failure due to lack of available channel bandwidth).

The CAM transmits a periodic signal that identifies that start of a Priority Client Access (PCA) period. The PCA message contains a value for the length of a PCA prefix period (PPP) and time for PCA period length (PPL). PPP is a period that precedes the actual PCA period and is the amount of time in when each PCAM must relay the PCA start signal to its CAM clients. The PPL is the time allocated for registered priority clients to transmit their data. A PPL length of zero indicates that the CAM (or PCAM) has no station registered as a station with a priority data delivery requirement. Only registered PCAMs may access the channel during the PCA prefix period.

The CAM polls each PCC and PPC during the PCA period. The message in the poll packet contains the amount of time the PCC (or PPC) may access the channel. This time may be less than the time contained in the RACK message; a lower value is an indication of channel degradation. The PCC must provide its own ability to adjust for differences in RACK channel access times. When polled, the PCC transmits its priority data to its target station(s). When the CAM polls a PCAM, the PCAM polls the PCC stations for which it is a proxy. When polled by the PCAM, the PCC station for which the PCAM performs a proxy service transmits its priority data to its target(s) stations.

Each wireless station contains a Channel Access Timer (CAT). Upon receiving a PCA start message, all stations set their CAT value equal to the sum of the PPP and PPL. CC stations do not attempt channel access until their CAT expires. PCAM's forward PCA messages to the stations for which they perform a proxy service.

Normal WLAN Operation for CAMs, PCAMs and CAM Clients

Figure 9A:
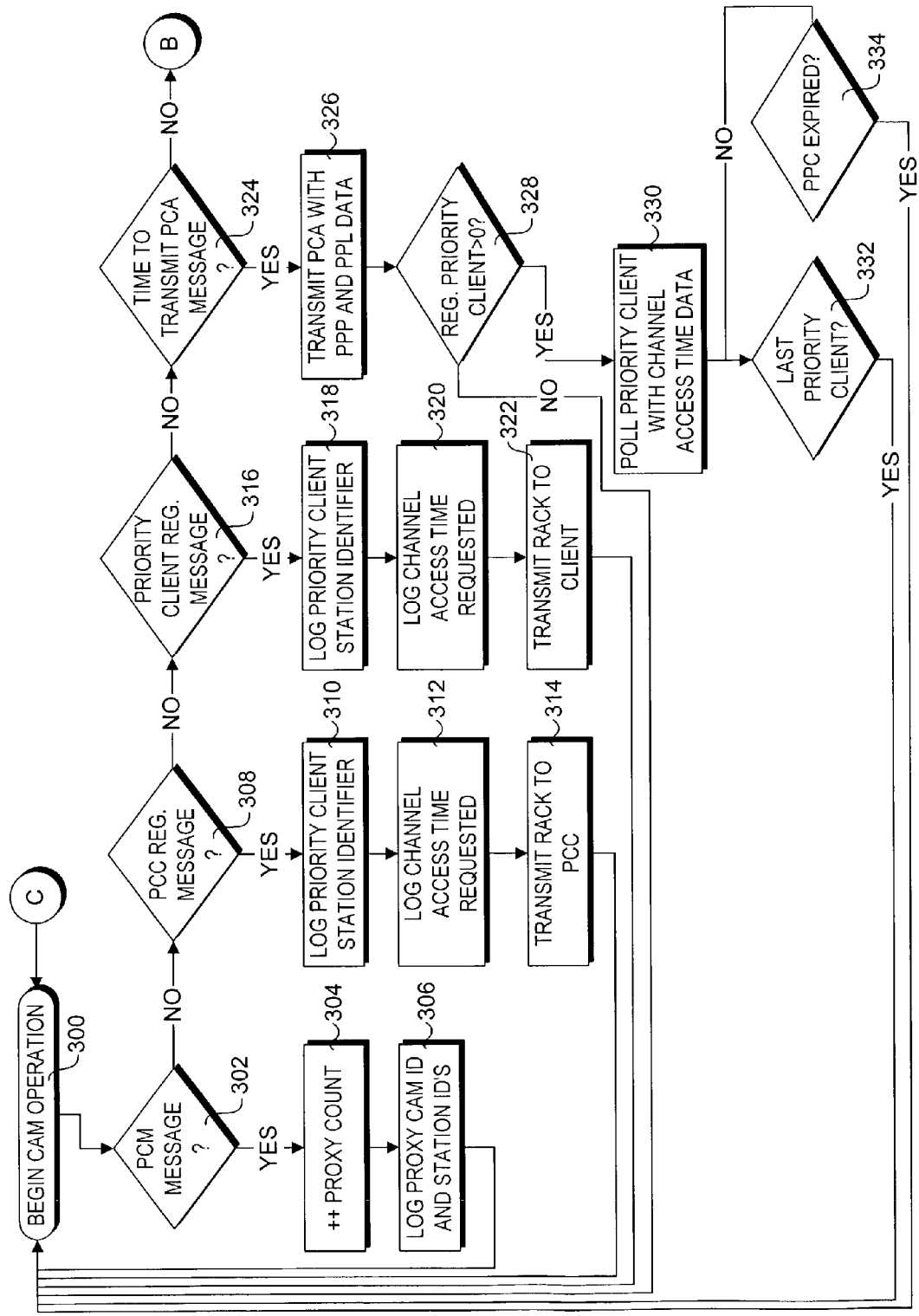
FIGS. 9A and 9B collectively comprise a flowchart illustrating the logic used by one embodiment of the invention when performing normal CAM operations.
Figure 9B:
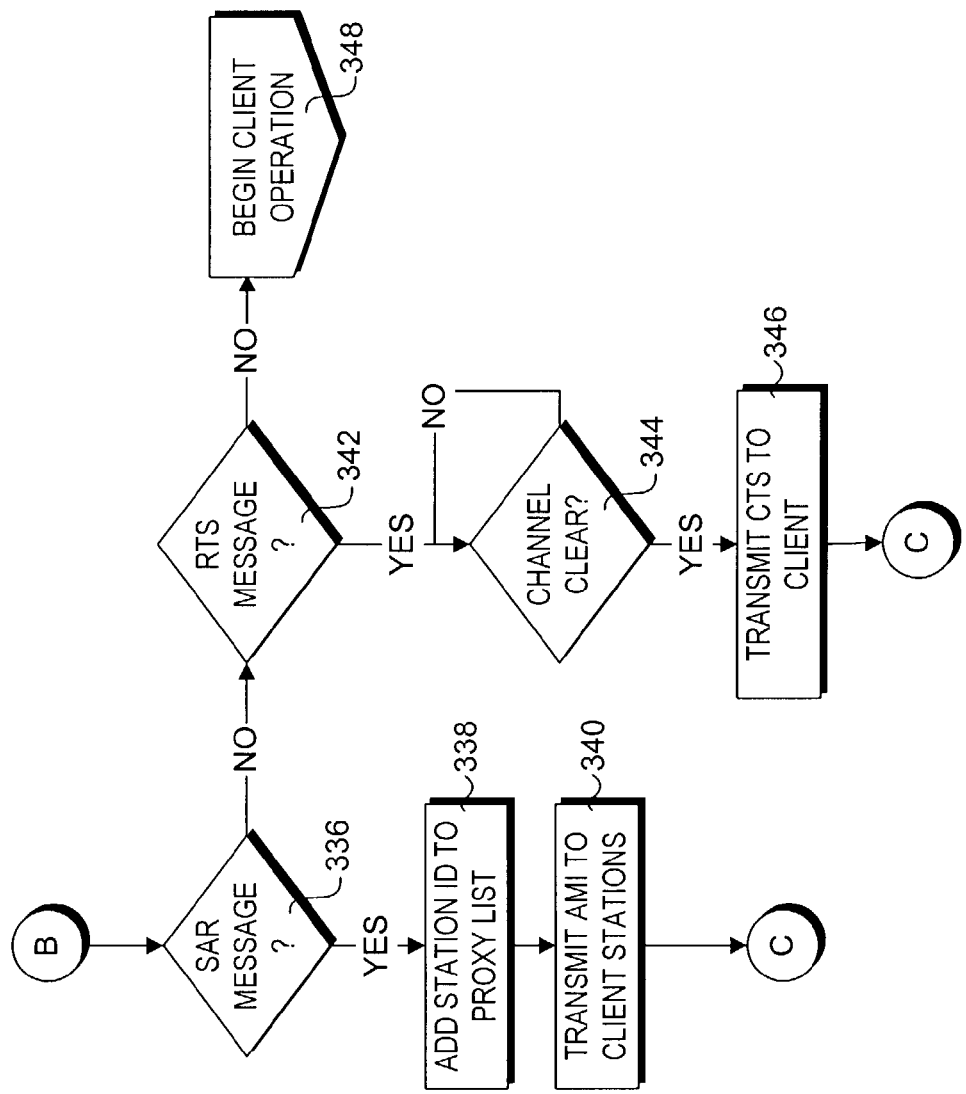

Normal operation of the system components (i.e., CAM, PCAM(s) and CAM Clients) is now described, beginning with normal CAM operations in accordance with one embodiment of the invention, which are shown in the flowchart of FIGS. 9A and 9B. As discussed above, the CAM serves as the message control center for the WLAN by monitoring and authorizing message requests from its CAM clients (CC's). Accordingly, the CAM is always listening for various messages sent by CC's or forwarded by PCAM's, including PCM messages, PCC registration messages, Priority Client registration messages, Time to Transmit PCA messages, SAR messages and RTS messages in response to a CAM operations in accordance with a start block 300.

As provided by a decision block 302, if the message is a PCM (proxy CAM message), the logic flows to a block 304 in which a proxy CAM count is incremented and a block 306 in which the proxy CAM ID for the PCAM that sent the PCM is logged, along with the Station ID's for the stations the PCAM can reach but can't be reached by the CAM itself. If the message is a PCC (Priority CAM Client) registration message, the answer to a decision block 308 is YES, and the station ID for the PCAM that sent the message is logged in a block 310, the channel access time requested is logged in a block 312, and a registration acknowledge (RACK) message is sent back to the priority CAM client in a block 314. Similarly, if the message is a Priority Client registration message, the answer to a decision block 316 is YES, and the station ID for the CAM Client that sent the message is logged in a block 318, the channel access time requested is logged in a block 320, and a RACK message is sent back to the CAM client in a block 322.

In accordance with a decision block 324, if it is time to transmit a PCA (Priority Client Access) message, the PCA message is transmitted in a block 326, along with the PPP and PPL data. A determination is then made in a decision block 328 to whether there are any registered priority clients. If the answer is NO, the logic returns to the beginning of CAM operations in start block 300 and the CAM awaits the next message or timing event. If there are registered priority clients, the CAM polls each of the priority CAM client(s) and/or priority proxy clients with its channel access time data in a block 330. This is repeated, as applicable until a determination is made to whether the last priority client has been polled in a decision block 332, or it is determined in a decision block 334 that the PPC period has expired. In accordance to a YES response to either of decision blocks 332 or 334, the logic loops back to begin CAM operations again in start block 300.

Continuing with the second half of the flowchart shown in FIG. 9B, if the message is an SAR (Station Association Request) message, the answer to a decision block 336 is YES and the logic flows to a block 338 in which the station ID for the station that sent the SAR message is added to the proxy client list for the CAM and to a block 340 in which the CAM transmits an AMI (Access Manager Identification) message to the client stations, whereupon the logic loops back to begin the next CAM operation.

If the message is an RTS (Request to Send) message, as determined by a decision block 342, the CAM waits for the channel to clear, as depicted by a decision block 344, and then transmits a CTS (Clear to Send) message back to the client that sent the RTS in a block 346. If none of the foregoing messages are applicable, the message corresponds to message designated for a CAM client rather than the CAM, and the logic proceeds to a begin client operation block 348 to begin client operations.

Figure 10:
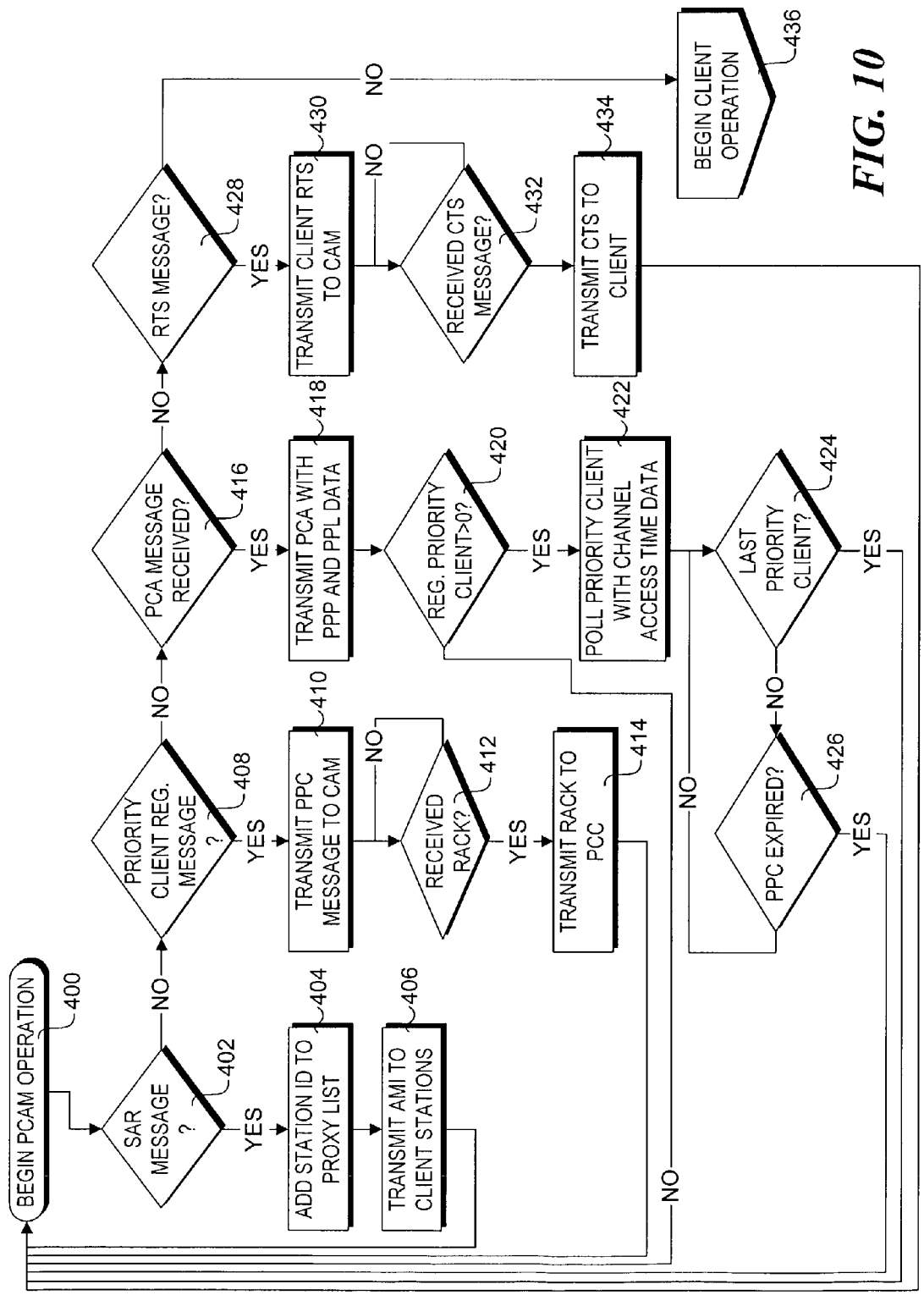
FIG. 10 is a flowchart illustrating the logic used by one embodiment of the invention when performing normal PCAM operations.

A proxy CAM enables the range of a CAM to be extended by performing a proxy function, whereby the proxy CAM acts as a go-between between stations that would normally be out-of-range of the CAM and the CAM and those stations that communicate with the proxy CAM think the are directly communicating with one another, although they are not. In accordance with the flowchart of FIG. 10, proxy CAM operations begin in a start block 400, with the PCAM listening for any messages for which it is targeted, including SAR messages, Priority Client registration messages, PCA messages, and RTS messages. As provided by a decision block 402, if the PCAM receives an SAR message, the logic proceeds to a block 404 in which the station ID is added to the proxy list of the PCAM, and to a block 406 in which the PCAM transmits an AMI message to all of the client stations within its range. The logic then loops back to start block 400 to begin the next PCAM operation.

In accordance with a decision block 408, if the message is a priority client registration message sent by a CAM client that desires to register as a priority CAM client, the PCAM transmits a PPC (Priority Proxy CAM) message to the CAM in a block 410 to register the PCAM as a priority proxy CAM with the CAM, and then waits to receive a RACK message from the CAM, as depicted by a decision block 412. Once the RACK message has been received, the PCAM transmits its own RACK message back to the new Priority CAM client, and the logic returns to start block 400 to begin the next CAM operation.

If the message is a PCA (Priority Client Access) message, as determined by a decision block 416, the PCAM transmits the PCA with PPP (PCA prefix period) and PPL (PCA period length) data in a block 418. A determination is then made in a decision block 420 to whether the registered priority client count for the PCAM is >0. If it is not, the logic returns to start block 400 to begin the next PCAM operation. If the registered priority client count is >0, indicating that at least one priority client has registered with the PCAM, the PCAM polls any priority clients with channel access time data in a block 422 until either the last priority client has been processed, or the PPC access period as expired, operations respectively depicted in decision blocks 424 and 426. When either of the conditions in decision blocks 424 and 426 are met, the logic returns to start block 400 to begin processing the next PCAM operation.

In a decision block 428, the PCAM determines if a CAM client has sent it an RTS (Request to Send) message. If it has, the RTS message is forwarded to the CAM in a block 430, and the PCAM waits to receive a corresponding CTS (Clear to Send message back from the CAM, as depicted by a decision block 432. Once the CTS message has been received, the PCAM forwards it to the CAM client that originally sent the RTS message, thereby informing that CAM client that it is free to use the channel to transmits its data and/or message to a target station.

In the event that the answers to all of decision blocks 402, 408, 416, and 428 is NO, the message is not meant for the PCAM, but rather corresponds to a client operation, as depicted by a begin client operation block 436.

Figure 11A:
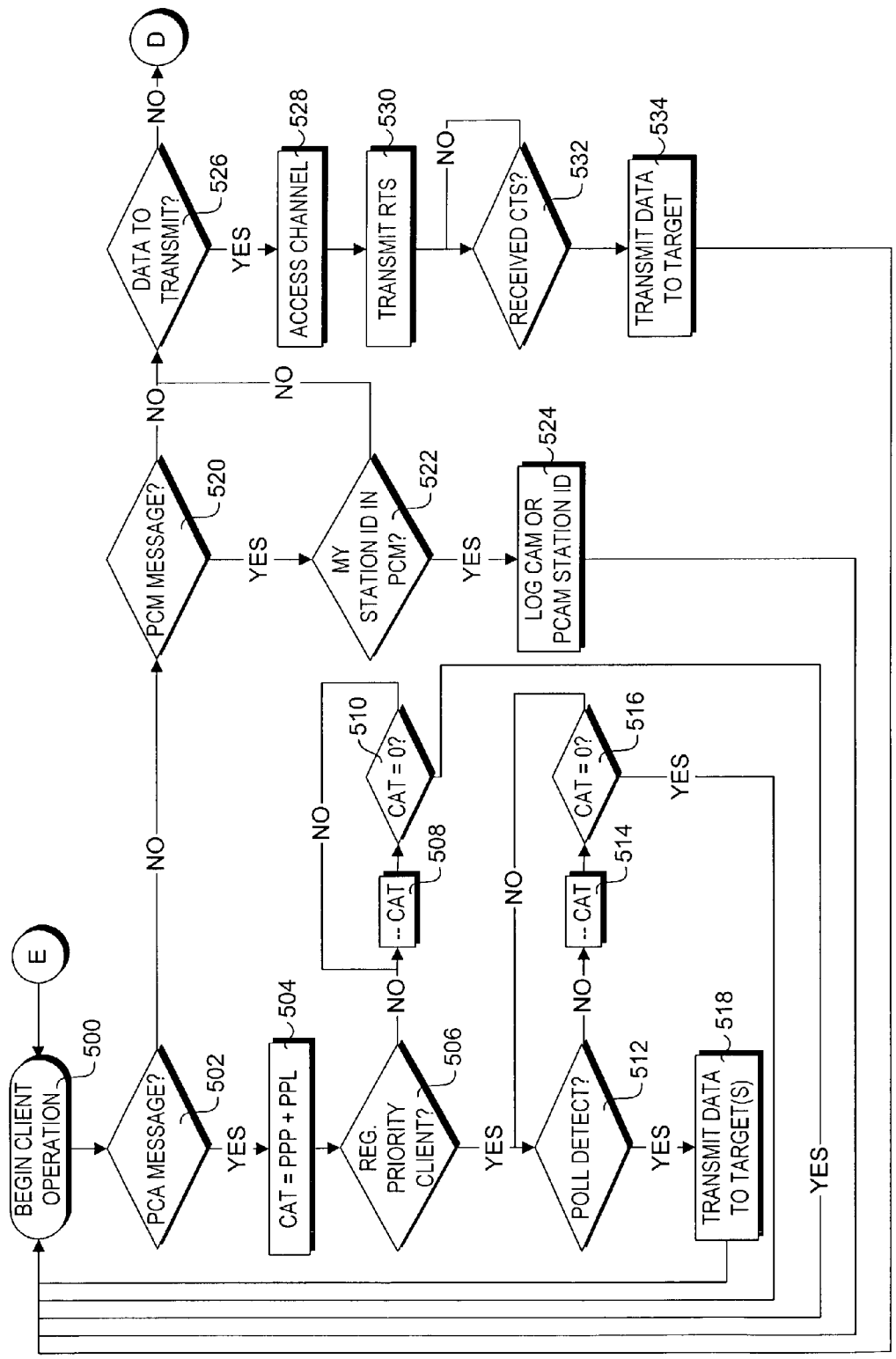
FIGS. 11A and 11B collectively comprise a flowchart illustrating the logic used by one embodiment of the invention when performing normal CAM client operations.
Figure 11B:
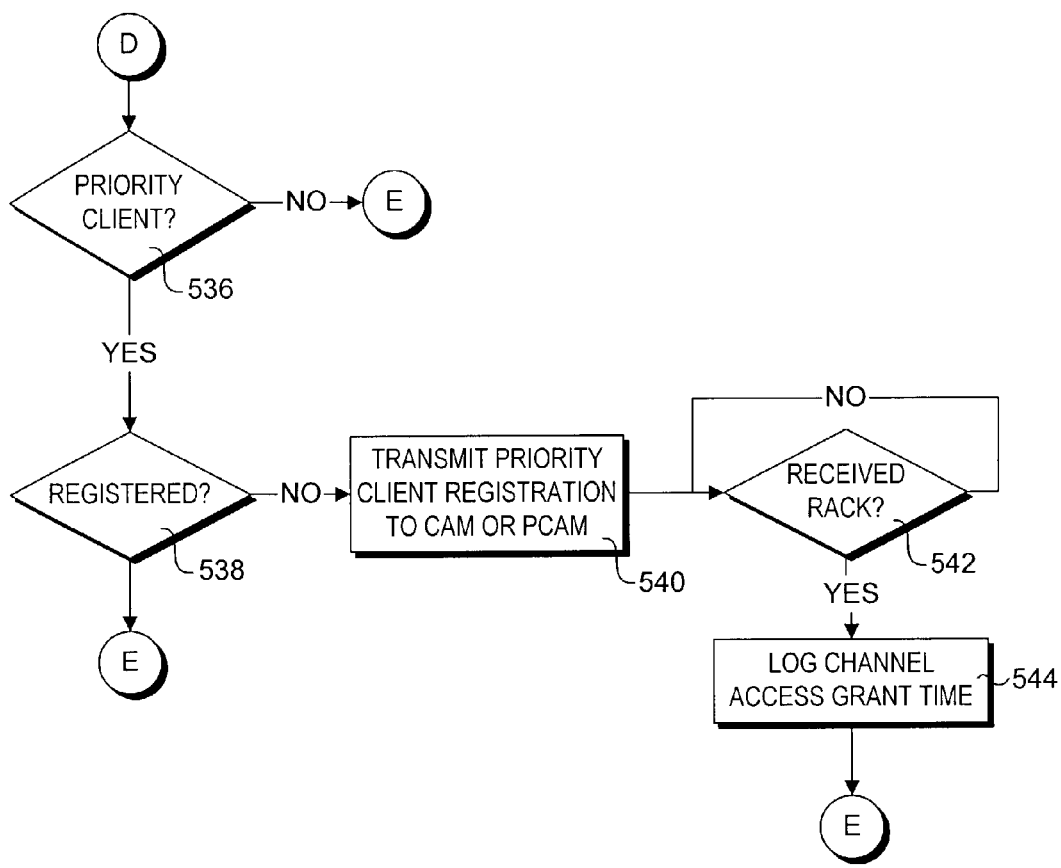

With reference to the flowchart of FIGS. 11A and 11B, CAM client operations begin in a start block 500 in which the CAM client monitors for any messages sent to it. In accordance with a decision block 502, if the CAM client receives a PCA (Priority Client Access) message the logic proceeds to a block 504 in which the Channel Access Timer (CAT) value for the CAM client is set to the sum of the PPP and PPL period values provided with the PCA message. Next, a determination is made in a decision block 506 to whether the CAM client is a registered priority client. If it is not, the logic loops through blocks 508 and 510, wherein the CAT timer value is decremented until it is 0, at which point the logic loop back to start block 500 to begin the next CAM client operation.

If the CAM client has registered as a priority client, the logic proceeds to a decision block 512 in which a determination is made to whether the CAM client detects a channel access time data poll from the CAM (or PCAM). If the answer is NO, the CAM client decrements the CAT value in a block 514 and determines if it is zero in a decision block 516. If CAT>0, the logic returns to decision block 512, otherwise the logic loops back to start block 500 to begin the next CAM client operation. If the poll is detected, the CAM client is immediately enabled to send its data, which is then transmitted to any station(s) that is/are targeted to receive the data in a block 518, whereupon the logic returns to start block 500.

If the message is a PCM (Proxy CAM) message, the logic flows to a decision block 522 in accordance with a decision block 520. In decision block 522, a determination is made to whether the station ID in the PCM is the same station ID as the CAM client, thereby indicating that the message is intended for the CAM client. If the answer is YES, the CAM or PCAM station ID provided in the PCM message is logged in a block 524, and the logic loops back to start block 500.

If the PCM message was not targeted for the CAM client, or if there was not a PCA or PCM message detected, the logic proceeds to a decision block 526 in which a determination is made to whether the CAM client has any data to transmit. If the answer is YES, the CAM client accesses the channel in a block 528, and transmits an RTS message in a block 530. The CAM client then waits to receive a clear to send message in accordance with a decision block 532. Upon receiving the RTS, the CAM Client transmits its data as depicted in block 534 and the logic returns to start the next CAM client operation in start block 500.

If the answer to each of decision blocks 502, 520, and 526 is NO, the logic proceeds to the portion of the flowchart shown in FIG. 11B, beginning with a decision block 536 in which a determination is made to whether the CAM client would like to register as a priority client. If the answer is NO, the logic loops back to start block 500 to begin the next CAM client operation. If the CAM client does desire to register as a priority client, the logic flows to a decision block 538 in which a determination is made to whether the CAM client has already registered as a priority client. If the answer is YES, the logic loops back to start block 500. If the CAM client has yet to register as a priority client, the logic proceeds to a block 540 in which it transmits a priority client registration message to the CAM (or PCAM, if applicable). The CAM client then waits to receive RACK message in accordance with a decision block 542. Once it receives the message, it logs the channel access grant time provided with the message in a block 544 and the logic returns to block 500 to begin processing the next CAM client operation.

As described above, the invention provides a system and method that enables a wireless LAN to be set up and implemented without requiring the use of an access point. As a result, the cost of the WLAN is reduced. Further benefits of the invention are restoration of the full bandwidth of the wireless medium (through elimination of the spoke and hub routing topology required with access points), extends the basic service set of a wireless station with a set of communication messages and protocols that establish Quality of Service, and eliminate the hidden station problem.

Station Performance Manager and Proxy SPM

In one embodiment, the basic service set extension can be used to create a Station Performance Manager (SPM) and one or more proxy Station Performance Managers (proxy SPMs). The notion of an SPM comes into play when a client station is located at the fringe of the radio range of a CAM, or otherwise (e.g., due to interference) suffers from poor bandwidth performance. For example, consider the bandwidths (i.e., communication transfer speeds) shown in FIG. 12, which corresponds to the WLAN 50A topology shown in FIG. 7. This configuration includes the same wireless communication paths shown in FIG. 3, with the addition of two new communication paths, including a communication path 90 between PCAM station 16 and station 23, and a communication path 92 between PCAM station 22 and station 25, wherein the bandwidth for each communication path is shown adjacent the communication path reference number. For example, the bandwidth of communication path 64 is 11 megabits per second (Mbps), while the bandwidth of communication path 58 is 2 Mbps.

Recall from above, that an IEEE 802.11b WLAN ideally provides a communication bandwidth of 11 Mbps, but that the network automatically reduces the transfer rate in steps from 11 to 5.5, then 2, and finally to 1 Mbps to maintain stability. As a result, stations that are at the fringe of the CAM's coverage area will often have reduced bandwidths with the CAM, such as stations 20, 14, and 16 in FIG. 12.

A proxy SPM increases the performance of fringe area clients stations by having messages routed via the proxy SPM rather than directly between a CAM and a CAM client station. For example, consider the direct communication path 58 between CAM station 18 and station 20. Since station 20 is located toward the limit of CAM station 18's coverage area 18C, the bandwidth between the CAM and station 20 is limited (in this instance, to only 2 Mbps). At the same time, consider that the bandwidths along each of communication paths 64 and 60, which form a relay path between CAM station 18 and station 20 via station 22, is 11 Mbps. As a result, if station 20 becomes a proxy SPM, it could be used to relay data between CAM station 18 and station 20. The resulting bandwidth between these endpoint stations would then be increased to approximately 5.5 Mbps (one-half of 11 Mbps—the actual average bandwidth would be a function of the message length, since each message now would require approximately twice the overhead messages as before to perform the relay), which is more than twice the previous bandwidth of 2 Mbps. Thus, the use of such a proxy SPM increases the data delivery performance of the WLAN.

In the foregoing instance, CAM station 18 is selected to provide Station Performance CAM operations, which include obtaining bandwidth topologies and determining the best routing paths bases on the bandwidth data it obtains. Messages between the CAM and its clients and PCAMs are then routed along the paths with the highest net bandwidths. Furthermore, proxy SPM stations may be used in transmission paths between CAM clients, or between a CAM client and a PCAM.

It is noted that a proxy SPM station need not coincide with a proxy CAM station, as occurred in the previous example. In fact, a WLAN with no proxy CAMs may implement multiple proxy SPM stations, or none at all, depending on the particular configuration of the WLAN.

Figure 12:
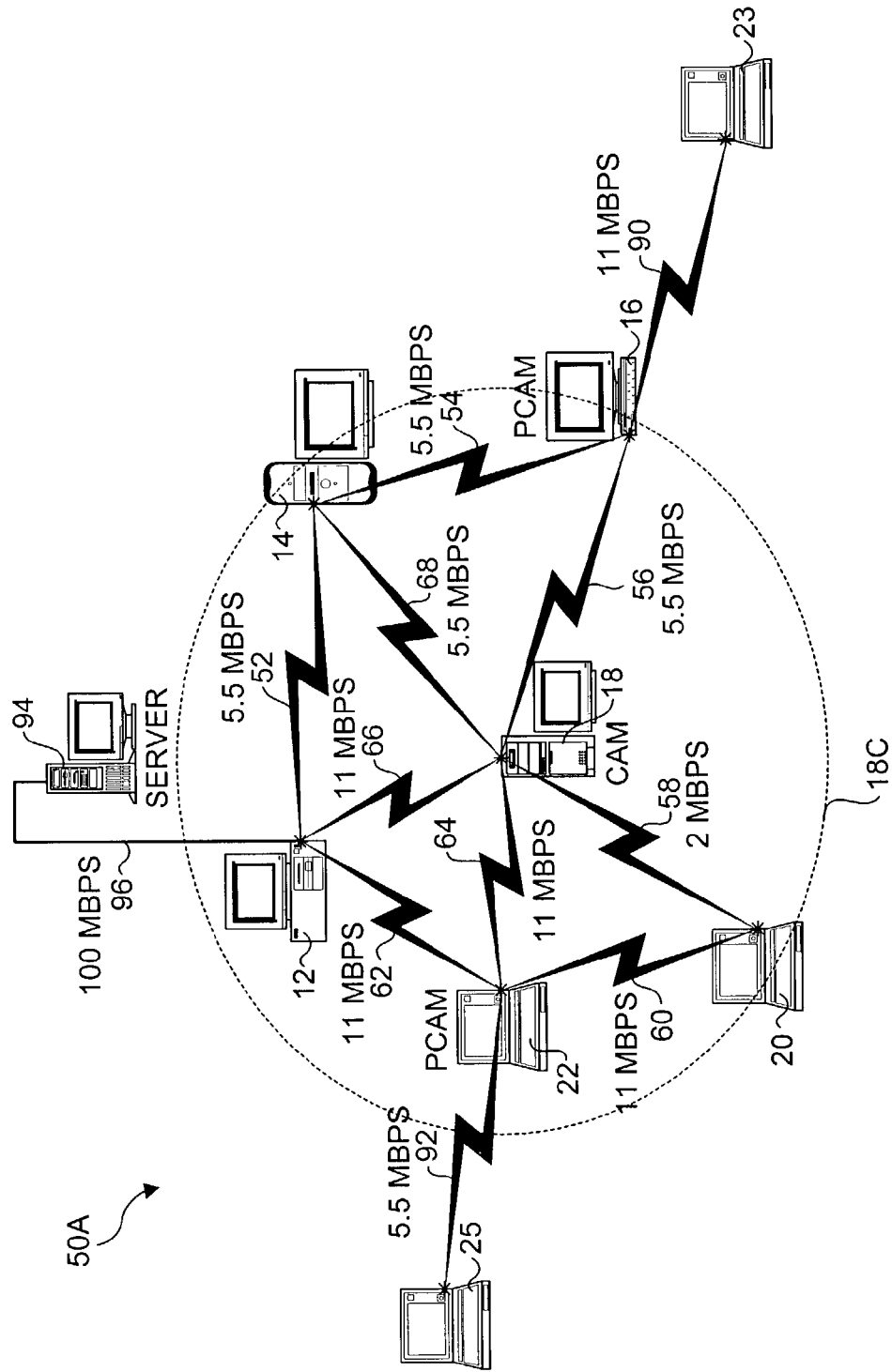
FIG. 12 is a schematic diagram illustrating the benefit of employing a proxy station performance manager.

Another use of a proxy SPM might occur if one or more of the computer stations is connected to a land-line network, as depicted in FIG. 12, wherein desktop computer station 12 is connected to a network server 94 via an Ethernet network 96. (It is noted that in many WLAN configuration, at least one of the computers in the WLAN will also be connected to a land-line network.) Suppose that station 20 would like to retrieve data from network server 94. Normally, messages and data that pass between station 20 and network server 94 would be routed along communication paths 58 and 66 (via relay by CAM station 18) and Ethernet network 96. However, in this instance, since communication path 58 has a limited bandwidth, it would be faster to send the data along communication paths 60 and 62, each of which has a bandwidth of 11 Mbps. In this instance, each of stations 22 and 12 may be used to perform the proxy SPM function.

Figure 13:
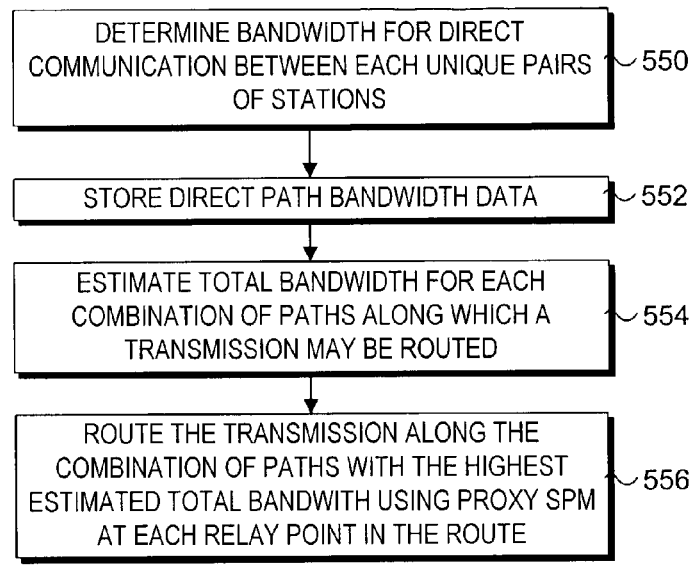
FIG. 13 is a flowchart illustrating the logic determine an optimal routing path to maximize transmission bandwidth.

With reference to the flowchart of FIG. 13, an SPM implementation in accordance with one embodiment of the invention begins in a block 550, wherein a determination of the bandwidths between each unique pairs of station is determined, whereupon the bandwidth data is stored in a block 552. For example, each station could transmit a message with a predetermined length to all stations within its range, marking the time the message begins to be sent and a time a return message of the same length from a receiving station is completely received. The bandwidth would then be twice the length of the message divided by the time between the beginning to send mark and completely received mark. Corresponding bandwidth data identifying the endpoint stations and respective bandwidths could then be forwarded to the CAM, which could store the bandwidth data in a lookup table.

For a given transmission request that identifies the endpoint stations of the transmission, the SPM would then estimate a total bandwidth along each combination of direct paths the transmission may be routed in a block 554. The transmission would then be routed along the combination of paths with the highest estimated total bandwidth in a block 556, employing the use of a proxy SPM at each relay point along the route. In one embodiment, the SPM would send routing data to be attached with the transmission (e.g., in a transmission header) that would be used by the proxy SPM(s) to route the message along the proper paths.

Exemplary Computer System in which the Invention may be Implemented

Figure 14:
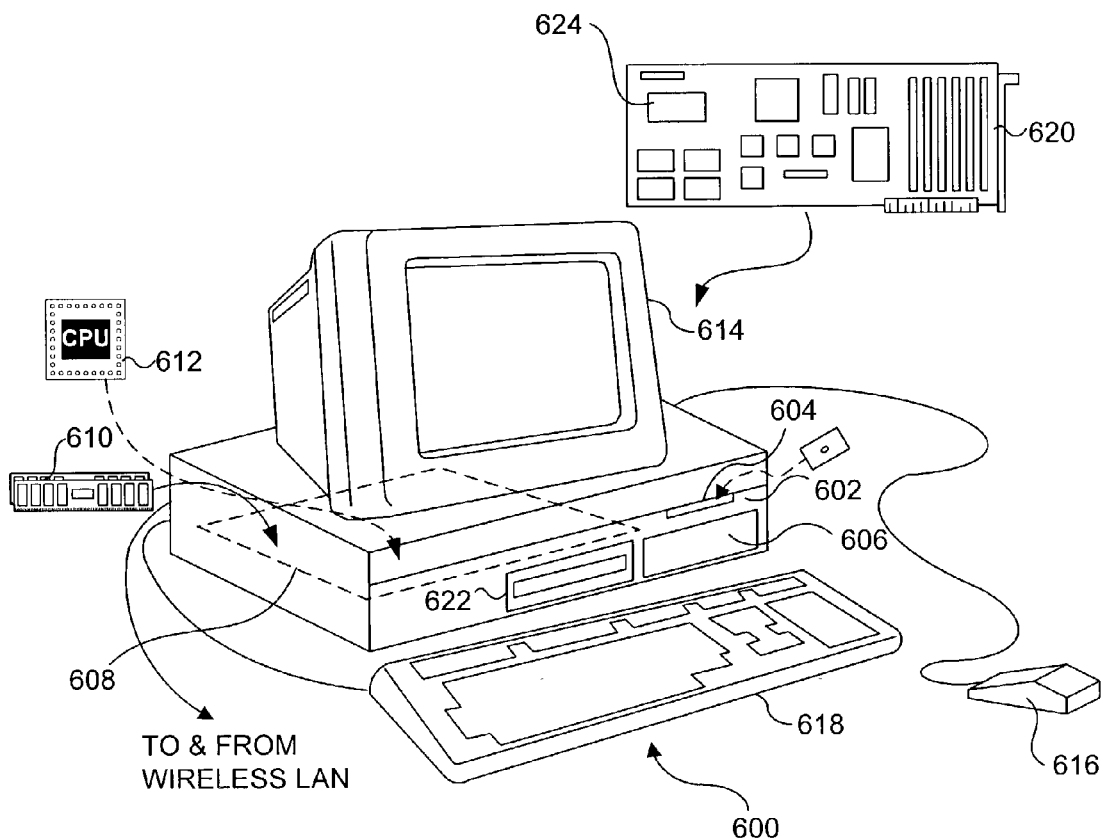
FIG. 14 is a schematic diagram of a computer system that may be used to implement the invention.

With reference to FIG. 14, a generally conventional computer 600 is illustrated, which is suitable for use as CAM, PCAM, and CAM client stations in connection with practicing the present invention. Examples of computers that may be suitable for client machines as discussed above include PC-class systems operating the Windows NT or Windows 2000 operating systems (desktops, towers, and laptops), Sun workstations operating the UNIX-based Solaris operating system, and various computer architectures that implement LINUX operating systems. Computer 600 is also intended to encompass various server architectures, as well as computers having multiple processors. Furthermore, many of the basic components of Computer 600 are also found in other devices that may be used for client stations, including wireless PDA's and pocket PC's.

Computer 600 includes a processor chassis 602 in which are mounted a floppy disk drive 604, a hard drive 606, a motherboard 608 populated with appropriate integrated circuits including memory 610 and one or more processors (CPUs) 612, and a power supply (not shown), as are generally well known to those of ordinary skill in the art. It will be understood that hard drive 606 may comprise a single unit, or multiple hard drives, and may optionally reside outside of computer 600. A monitor 614 is included for displaying graphics and text generated by software programs and program modules that are run by the computer. A mouse 616 (or other pointing device) may be connected to a serial port (or to a bus port or USB port) on the rear of processor chassis 602, and signals from mouse 616 are conveyed to the motherboard to control a cursor on the display and to select text, menu options, and graphic components displayed on monitor 614 by software programs and modules executing on the computer. In addition, a keyboard 618 is coupled to the motherboard for user entry of text and commands that affect the running of software programs executing on the computer. Computer 600 also includes a wireless network interface card (NIC) 620 or built-in network adapter for connecting the computer to a wireless computer network, such as a WLAN. For laptop computers, the wireless NIC will typically comprise a PCMCIA card or built-in circuitry. Computer 600 may also include a wired network interface card to connect to a wired network, such as a LAN, WAN, or the Internet. Typically, computer 600 will further include a compact disk-read only memory (CD-ROM) drive 622 into which a CD-ROM disk may be inserted so that executable files and data on the disk can be read for transfer into the memory and/or into storage on hard drive 606 of computer 200. Other mass memory storage devices such as an optical recorded medium or DVD drive may be included.

In general, the various algorithms of the invention discussed above may be implemented via firmware and/or software modules comprising machine instructions for implementing the operations of each algorithm. For example, under Microsoft Windows environments, networking operations are supported by one or more network services, wherein each network service (e.g., TCP/IP) interfaces with the operating system (OS) and/or another network service to enable network communication between computer 600 and another computer on the network. Under UNIX and LINUX environment, similar operations/interfaces are provided by one or more "daemons." Typically, a wireless NIC driver comprising a set of machine instructions that when loaded and executed by the processor provides a specific interface between the wireless NIC and the OS and/or OS network service will also be provided. Generally, the wireless NIC driver will comprise a software-loadable module and/or firmware instructions contained in an option ROM 624 on the wireless NIC. Typically, the software-loadable module will be distributed on floppy disks or CD-ROMs (or other memory media) and stored in the hard drive until loaded into random access memory (RAM) for execution by the CPU. Optionally, all or a portion of the machine instructions may be loaded via a computer network as a carrier wave.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

What is claimed is:

1. A method comprising:
    assigning one of a plurality of stations in a wireless network to manage transmission traffic across the wireless network, said one station corresponding to a channel access manager (CAM);
    assigning at least one of said plurality of stations as a proxy CAM (PCAM) to perform proxy operations for the CAM to enable the CAM to control channel access for stations in the wireless network that are outside of a communication range of the CAM but within communication range of a PCAM; and
    managing data transmissions between said plurality of stations that are sent over a wireless communication channel provided by the wireless network with the CAM and said at least one PCAM.

2. The method of claim 1, wherein the CAM is assigned by performing the operations of:
    determining a count of stations that are within a communication range of each of said plurality of stations; and
    assigning a station with the highest count of stations to be the CAM.

3. The method of claim 1, wherein the CAM manages the transmission traffic by performing the operations of:
    monitoring the wireless communication channel for a request to send data that is sent to the CAM from another station in the wireless network;
    determining when the wireless communications channel is clear; and
    sending a message to the station that requested to send data authorizing that station to send its data over the wireless communications channel.

4. The method of claim 1, wherein the CAM manages the transmission traffic by controlling when transmissions over the wireless communications channel may be performed to ensure that none of said plurality of stations is in communication range of more than one transmitting station at a time.

5. The method of claim 4, wherein the transmission traffic may include two or more concurrent transmissions between respective sets of stations, each set of stations including a respective transmitting station and at least one respective target station, and wherein each target station is in communication range of only one transmitting station during the concurrent transmissions.

6. The method of claim 1, further comprising providing a quality of service operation that enables time-critical delivery of data between a transmitting station and a receiving station over the wireless communication channel by preventing other stations from accessing the wireless communication channel until all of the data has been received by the receiving station.

7. The method of claim 1, wherein assignment of said at least one PCAM is determined by:
    identifying any stations from among said plurality of stations that are within a communication range of both the CAM and another station that is not in the communication range of the CAM; and
    assigning at least one station from among any station stations that are identified to perform proxy operations for the CAM.

8. The method of claim 7, wherein identifying stations that may be assigned to perform proxy operations for the CAM comprises:
    sending out a station identification request message from each station requesting any station that receives the message to respond with a message identifying that station;
    sending station identification response messages back to the sending stations;
    creating a respective list for each station identifying all of the stations that responded to that station;
    comparing each respective list with a list identifying the stations that responded to the CAM station to determine if any of said respective lists contains a station that is not listed in a list of stations that responded to the CAM; and
    determining the station(s) corresponding to any list that contains a station that is not listed in the list of stations that responded to the CAM.

9. The method of claim 1, further comprising:
    determining an optimal routing path from among a plurality of optional routing paths that would enable a given transmission to be sent from a first station to be received by a second station in the shortest amount of time; and
    routing the message along the routing path by providing routing information to the first station and any station along the optimal routing path that may be employed to relay the transmission to the second station.

10. The method of claim 9, wherein determining the optimal routing path comprises:
    monitoring direct transmission bandwidths between each unique pair of stations in the wireless network;
    estimating an overall transmission path bandwidth for at least two different routing paths that would enable the given message to be sent from the first station to the second station; and
    selecting the routing path having the highest estimated overall transmission path bandwidth.

11. The method of claim 1, wherein the transmission traffic for the wireless network is being managed by an existing CAM, further comprising:
    enabling a new station to join the wireless network;
    determining if the new station would be a better station to perform the transmission traffic management operations provided by the existing CAM than the existing CAM; and assigning the new station to be the CAM if it is determined that the new station would be better than the existing CAM for performing the transmission traffic management operations.

12. An article of manufacture comprising:
a machine-readable media on which a plurality of instructions comprising a wireless network driver are stored that when executed by each of a plurality of stations in a wireless network enables management of network transmission traffic across the wireless network perform operations including,
selecting a station from among said plurality of stations to perform network communication traffic management operations, said station comprising a channel access manager (CAM);
selecting at least one of said plurality of stations as a proxy CAM (PCAM) to perform proxy operations for the CAM to enable the CAM to control channel access for stations in the wireless network that are outside of a communication range of the CAM but within communication range of a PCAM;
notifying each station that is within communication range of the CAM of which station is the CAM;
notifying any station for which a PCAM is to perform CAM proxy operations for of which station is the PCAM for that station; and
obtaining channel access authorization from the CAM or a PCAM prior to transmitting data between stations.

13. The article of manufacture of claim 12, wherein the CAM is selected by performing the operations of:
broadcasting a station identification request message from each station requesting any station within a communication range of the station broadcasting the message to respond with a message identifying that station;
for each station within the communication range of the station that broadcast a station identification request message, sending a station identification response message back to the station that broadcast the station identification request message;
for each of said plurality of stations, determining a count of stations that responded to that station's station identification request message;
broadcasting a first message station count message from one of said plurality of stations identifying the count of stations for that station; and
broadcasting subsequent station count messages from zero or more stations identifying the count of stations for each of said zero or more stations, wherein each subsequent message is sent from a station having a count of stations greater than a station that sent a preceding station count message,
wherein a last station to broadcast a station count message becomes the CAM.

14. The article of manufacture of claim 12, wherein the station selected for the CAM manages the network transmission traffic by performing the operations of:
monitoring a wireless network channel for requests to send data that are sent to the CAM from other stations in the wireless network;
determining when the wireless network channel is clear; and
sending messages to the stations that requested to send data authorizing each of those stations to send its data over the wireless network channel.

15. The article of manufacture of claim 12, wherein the CAM manages the network transmission traffic by controlling when transmission between stations may be performed to ensure that no station ever receives concurrent transmissions from multiple other stations.

16. The article of manufacture of claim 12, wherein the CAM enables a sending station to deliver data to a receiving station in a time-critical manner by preventing other stations from accessing a wireless channel over which the data is transmitted until all of the data has been received by the receiving station.

17. The article of manufacture of claim 12, wherein execution of the wireless network driver by said plurality of stations enables the PCAM stations to be selected by performing the operations of:
sending out a station identification request message from each station requesting any station that receives the message to respond with a message identifying that station;
in response to receiving a station identification request message, sending a station identification response messages back to the station that sent the station identification request message;
for each station, logging an identity of any station that responded to that station's station identification request message into a station identification list;
sending the station identification lists to the CAM;
comparing each respective station identification list sent to the CAM with a station identification list for the CAM to determine if any station identification list sent to the CAM contains a station that is not contained in the station identification list for the CAM; and
identifying any station(s) that sent a station identification list to the CAM that contains a station that is not contained in the station identification list of the CAM,
wherein any station that is identified may be selected to operate as a PCAM.

18. The article of manufacture of claim 12, wherein execution of the wireless network driver by said plurality of stations further performs the operations of:
determining an optimal routing path from among a plurality of optional routing paths that would enable a given transmission to be sent from a first station to be received by a second station in the shortest amount of time; and
routing the message along the routing path by providing routing information to the first station and any station along the optimal routing path that may be employed to relay the transmission to the second station.

19. The article of manufacture of claim 12, wherein the machine-readable media comprises a non-volatile storage device that is accessible to a wireless network adapter and said plurality of machine instructions comprise firmware code that is stored in the non-volatile storage device.

20. A wireless local area network (WLAN) comprising:
a first station comprising a channel access manager (CAM) station; and
a plurality of client stations, each client station linked in wireless communication with at least one other client station and/or the CAM station, at least one of the client stations operating as a proxy CAM (PCAM) station.
wherein the CAM station performs network transmission traffic management operations for the WLAN by controlling when transmission between client stations may occur and wherein said at least one PCAM station performs proxy operations for the CAM to enable the CAM to control channel access for stations in the WLAN that are outside of a communication range of the CAM station but within communication range of a PCAM station.

21. The WLAN of claim 20, wherein each of the CAM station and client stations comprise:
- a memory, in which a plurality of executable software modules are stored, including an operating system network service and a wireless network driver;
- a processor, coupled to the memory; and
- a wireless network adapter, coupled to the processor, via which wireless radio signals corresponding to a WLAN communication channel may be transmitted and received,
- wherein respective execution of the operating system network service and the wireless network driver by the processors of the CAM station and the client stations enables the CAM station to control access to the WLAN communication channel through a predefined communication protocol comprising a set of channel access control messages that are transmitted between the CAM station and the client stations.

22. The WLAN of claim 21, wherein upon initialization, all of the stations in the WLAN, including the CAM station, comprise client stations, and wherein respective execution of the operating system network service and the wireless network driver by the processors of the CAM station and the client stations selects one of the client stations to become the CAM station by performing the operations of:
- determining a count of client stations that are within a communication range of each of said plurality of client stations; and
- assigning a station with the highest count of stations to be the CAM station.

23. The WLAN of claim 20, wherein the CAM station manages the network transmission traffic by performing the operations of:
- monitoring a wireless communication channel corresponding to the WLAN for a request to send data that is sent to the CAM station from a client station;
- determining when the wireless communication channel is clear; and
- sending a message to the client station that requested to send data authorizing that client station to send its data over the wireless communications channel.

24. The WLAN of claim 20, wherein upon initialization, each PCAM station comprises a client station that is selected to be a PCAM station by performing the operations of:
- identifying any client stations in the WLAN that are not within communication range of the CAM,
- identifying any client station that is enabled to communicate with a client station that was identified as not being within communication range of the CAM; and
- assigning those client stations that are enabled to communicate with a client station that was identified as not being within communication range of the CAM to become a PCAM.

25. The WLAN of claim 20, wherein the CAM station manages the network transmission traffic by controlling when transmissions over a wireless communications channel corresponding to the WLAN may be sent from a transmitting station to one or more receiving stations to ensure that none of said plurality of client stations is in communication range of more than one transmitting station at a time.

26. The WLAN of claim 25, wherein the CAM stations enables a sending client station to deliver data to a receiving client station in a time-critical manner by preventing other client stations from accessing a wireless channel over which the data is transmitted until all of the data has been received by the receiving client station.

27. The WLAN of claim 20, wherein management of the network transmission traffic by the CAM further includes to operations of:
- determining an optimal routing path from among a plurality of optional routing paths that would enable a given transmission to be sent from a first client station to be received by a second client station in the shortest amount of time; and
- routing the message along the routing path by providing routing information to the first client station and any client station along the optimal routing path that may be employed to relay the transmission to the receiving client station.

* * * * *